United States Patent
Danilov et al.

(10) Patent No.: US 10,268,417 B1
(45) Date of Patent: Apr. 23, 2019

(54) BATCH MODE OBJECT CREATION IN AN ELASTIC CLOUD DATA STORAGE ENVIRONMENT

(71) Applicant: EMC IP Holding Company LLC, Hopkinton, MA (US)

(72) Inventors: Mikhail Danilov, Saint Petersburg (RU); Mark A. O'Connell, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/792,745

(22) Filed: Oct. 24, 2017

(51) Int. Cl.
*G06F 12/00* (2006.01)
*G06F 3/06* (2006.01)

(52) U.S. Cl.
CPC .............. *G06F 3/065* (2013.01); *G06F 3/064* (2013.01); *G06F 3/0626* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 8,966,173 B1* | 2/2015 | Taylor ..................... | G06F 12/14 711/114 |
| 2007/0088767 A1* | 4/2007 | Passerini ............. | G06F 11/1435 |
| 2007/0250673 A1* | 10/2007 | Eidswick ............ | G06F 11/1461 711/162 |
| 2015/0120749 A1* | 4/2015 | Phanishayee ..... | G06F 17/30321 707/741 |
| 2015/0156174 A1* | 6/2015 | Fahey ................. | H04L 63/0428 713/168 |
| 2016/0292178 A1* | 10/2016 | Manville ........... | G06F 17/30159 |
| 2017/0097875 A1* | 4/2017 | Jess ..................... | G06F 11/2069 |
| 2017/0230352 A1* | 8/2017 | Chen ................... | H04L 63/0442 |
| 2018/0089224 A1* | 3/2018 | Muthuswamy ..... | H04L 67/1097 |
| 2018/0165190 A1* | 6/2018 | Danilov .............. | G06F 12/0261 |
| 2018/0275898 A1* | 9/2018 | Bhansali ............... | G06F 3/0608 |

* cited by examiner

*Primary Examiner* — Daniel D Tsui
(74) *Attorney, Agent, or Firm* — Amin, Turocy & Watson, LLP (57) ABSTRACT

Batch mode object creation in an elastic cloud data storage environment is presented herein. A batch mode data chunk component is configured to: facilitate a creation of a batch of objects corresponding to an application; store first objects of the batch of objects in a group of data storage chunks; and based on a determination that a data storage chunk of the group of data storage chunks contains at least a defined amount of data, seal the data storage chunk to obtain a sealed data storage chunk; and a data protection component configured to: perform erasure encoding on the sealed data storage chunk, and replicate the sealed data storage chunk on a data recovery storage device.

20 Claims, 10 Drawing Sheets

BATCH MODE OBJECT CREATION IN AN ELASTIC CLOUD DATA STORAGE ENVIRONMENT

TECHNICAL FIELD

The subject disclosure generally relates to embodiments for batch mode object creation in an elastic cloud data storage environment.

BACKGROUND

Conventional storage technologies facilitate remote storage and access of data via the cloud. However, as the demand for such storage and access has increased, so too has the risk of storage failures and costs associated with recovering from such failures. Accordingly, storage systems reduce the risk of storage failures and facilitate recovery of data utilizing data chunk(s), while applications manipulate such data utilizing data object(s). Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to managing risk of storage failures by utilizing data chunks, while applications manipulate data at an object level. In this regard, a storage system utilizes a preliminary protection scheme of mirroring portions, segments, etc. of a data object of an application—before the storage system seals data chunk(s) corresponding to an entire data object comprising the data object. Further, after the data chunk(s) are sealed, the storage system utilizes a final protection scheme of erasure coding to protect the sealed data chunk(s), and acknowledges, informs, etc. the application that the data object has been protected.

The preliminary protection scheme of mirroring described above incurs excessive disk and network traffic as portion(s) of a data object are temporarily protected before corresponding data chunk(s) are sealed and protected via erasure coding. Further, storage results are reported to a corresponding application on an object-by-object basis, e.g., after sealed data chunk(s) of an object have been protected—incurring excessive storage system overhead related to object-by-object reporting of storage results. On the other hand, various embodiments disclosed herein can improve application performance and reduce storage system overhead by facilitating creation of a batch of objects, and storing objects of the batch of objects in a defined group of data storage chunks.

For example, a system, e.g., a batch mode data storage system, can comprise a batch mode data chunk component that can be configured to facilitate a compilation, creation, etc., by an application, of a batch, group, etc. of objects of the application. In turn, in response to first objects of the batch of objects being streamed by the application, the batch mode data chunk component can write, store, etc. the first objects in a group of data storage chunks, e.g., which have been designated, dedicated, etc. by the system to store the batch of objects.

Further, based on a determination that a data storage chunk of the group of data storage chunks contains at least a defined amount of data, e.g., representing that the data storage chunk has been filled, the batch mode data chunk component can seal the data storage chunk to obtain a sealed, e.g., immutable, read-only, etc. data storage chunk.

In turn, the system can comprise a data protection component that can be configured to perform erasure encoding on the sealed data storage chunk, and replicate the sealed data storage chunk on a data recovery storage device, e.g., within geographically distributed data storage 120.

In an embodiment, the system can receive, from the application, information representing a total number of objects that have been included in the batch of objects, and representing a data size of the batch of objects. In turn, the batch mode data chunk component can pre-create, designate, dedicate, etc. data storage chunks of the group of data storage chunks based on the information.

In another embodiment, the batch mode data chunk component can dynamically create the data storage chunks, e.g., in response to receiving portions of the data stream from the application. For example, based on a determination that a first data storage chunk of the group of data storage chunks contains at least a defined amount of data, e.g., representing that the first data storage chunk has been filled, and based on a determination that remaining objects of the batch of objects have not been stored in the group of data storage chunks, the batch mode data chunk component can create a second data storage chunk of the group of data storage chunks, and store a portion of the remaining objects in the second data storage chunk.

Further, based on a determination that the second data storage chunk contains at least the defined amount of data, e.g., representing that the second data storage chunk has been filled, the batch mode data chunk component can seal the second data storage chunk to obtain a second sealed data storage chunk.

In turn, the data protection component can perform erasure encoding on the second sealed data storage chunk, and replicate the second sealed data storage chunk on the data recovery storage device.

In one embodiment, the data protection component can periodically acknowledge, e.g., send partial acknowledgements, to the application indicating that subsets of objects of the batch of objects have been successfully protected. For example, the data protection component can send an acknowledgment directed to the application representing that the first sealed data storage chunk and the second sealed data storage chunk have been replicated, protected, etc. on the data recovery storage device.

In turn, in response to determining that a partial acknowledgement corresponding to a subset of objects of the batch of objects has not been received, the application can resend, re-write, re-stream, etc. the subset of objects. Further, the batch mode data chunk component can store the subset of objects in corresponding data chunks of the group of data storage chunks and seal the corresponding data chunks to obtain sealed data chunks. Furthermore, the data protection component can perform erasure encoding on the sealed data chunks, and replicate the sealed data chunks on the data recovery storage device.

In another embodiment, based on a determination that the application has completed the write, stream, etc. of the batch of objects, and that second objects of the batch of objects have not been replicated, protected, etc., e.g., the second objects of the batch of objects comprising failed objects, the data protection component can send information directed to the application comprising a list of the failed objects that have not been replicated, protected, etc.

In turn, the application can re-write, re-stream, etc. the failed objects; and the batch mode data chunk component can receive the failed objects from the application, store the failed objects in a data storage chunk, and seal the data storage chunk to obtain a sealed data storage chunk. Further, the data protection component can perform erasure encoding on the sealed data chunk, and replicate the sealed data storage chunk on the data recovery storage device.

In an embodiment, a method can comprise: in response to facilitating, by a system comprising a processor, generation, e.g., via an application of a first device, of a group, batch, etc. of data objects of the application, storing, by the system, a portion of the group of data objects in a group of data chunks; and in response to a data chunk of the group of data chunks being determined to satisfy a defined condition with respect to an amount of data that has been included in the data chunk, sealing the data chunk to obtain a sealed data chunk, performing erasure encoding on the sealed data chunk, and replicating the sealed data chunk on a second device of geographically distributed data storage devices.

In one embodiment, the storing comprises: receiving, from the application, a data stream comprising the portion of the group of data objects; and storing the data stream in the group of data chunks.

In another embodiment, the storing comprises: receiving, from the application, information representing: a number of data objects of the application that have been included in the group of data objects, respective sizes of the data objects that have been included in the group of data objects, and/or a data size of the group of data objects; and based on the information, generating the group of data chunks.

In an embodiment, the data chunk comprises a first data chunk, the portion comprises a first portion, and the storing comprises: generating, creating, etc. the first data chunk; storing the first portion in the first data chunk; and in response to sealing the first data chunk, generating a second data chunk of the group of data chunks, and storing a second portion of the group of data objects in the second data chunk.

In turn, in one embodiment, the method further comprises: sealing, by the system, the second data chunk to obtain an other sealed data chunk; and replicating, by the system, the other sealed data chunk on the second device of geographically distributed data storage devices.

In another embodiment, the method further comprises sending, by the system, status information directed to the application—the status information representing data objects of the group of data objects that have not been replicated.

One embodiment can comprise a machine-readable storage medium comprising instructions that, in response to execution, cause a system comprising a processor to perform operations, comprising: facilitating a compilation, via an application, of objects of the application into a batch of objects; in response to receiving, from the application, a stream of data comprising the batch of objects, storing a first portion of the batch of objects in data storage chunks; and in response to determining that a data storage chunk of the data storage chunks has been filled with a defined amount of data, sealing the data storage chunk resulting in a sealed data storage chunk, performing erasure coding on the sealed data storage chunk, and replicating the sealed data storage chunk to a data storage device.

In another embodiment, the operations further comprise: in response to receiving, from the application, information representing a number of the objects that have been included in the batch of objects, respective sizes of the objects that have been included in the batch of objects, and/or a size of the batch of objects, generating the data storage chunks based on the information.

In yet another embodiment, the operations further comprise: sending information directed to the application specifying a second portion of the batch of objects that have not been replicated on the data storage device.

As described above, conventional network technologies have had some drawbacks with respect to a incurring excessive disk and network traffic data objects are temporarily protected, via mirroring, before corresponding data chunks are sealed and protected via erasure coding. Further, such technologies have had some drawbacks with respect to incurring excessive storage system overhead related to object-by-object reporting of storage results.

Various embodiments described herein can improve application performance and reduce storage system overhead by facilitating creation of a batch of objects, and storing objects of the batch of objects in a designated group of data storage chunks.

Now referring to FIGS. 1-4, block diagrams of a cloud-based storage environment (100) comprising a batch mode data storage system (125); the batch mode data storage system comprising a batch mode data chunk component (210) and a data protection component (220); a client system (110) comprising a batch component (315); and the batch mode data storage system facilitating storage of a batch of objects in a group of dedicated data chunks (412, 414) are illustrated, respectively, in accordance with various example embodiments.

Figure 1:
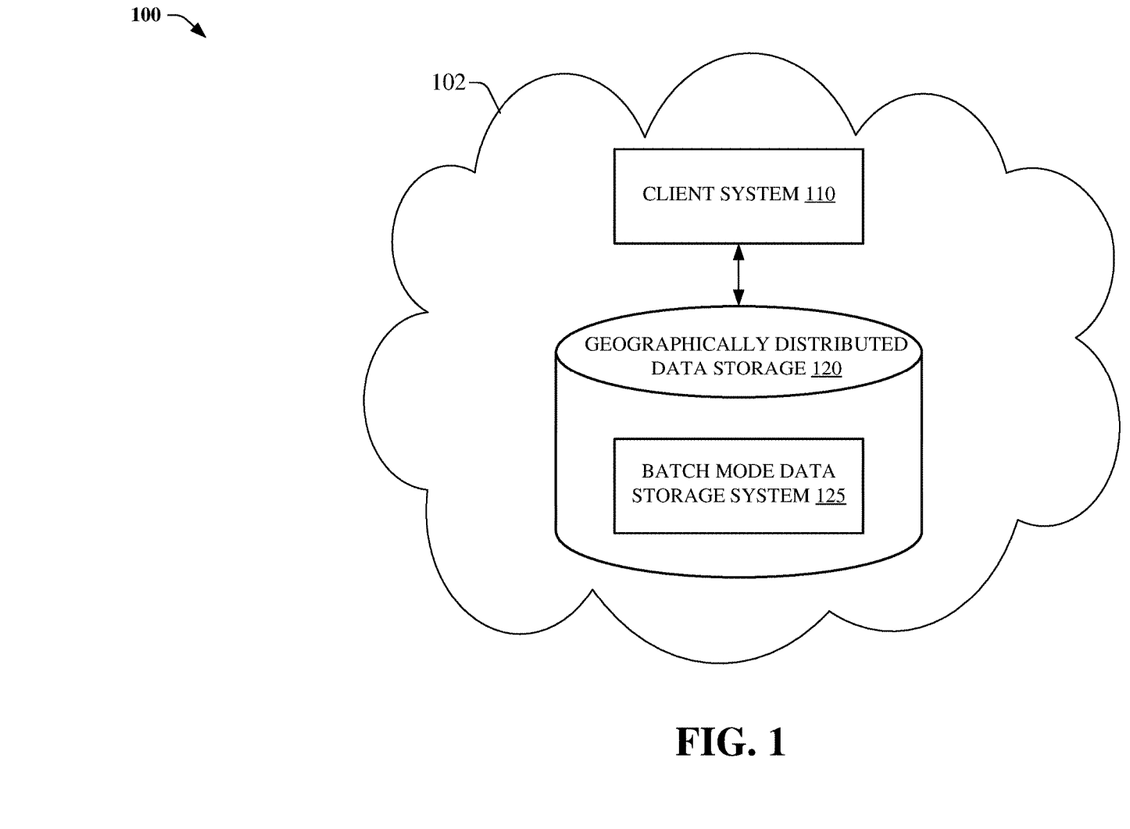
FIG. 1 illustrates a block diagram of a cloud-based data storage environment comprising a batch mode data storage system, in accordance with various example embodiments.
Figure 2:
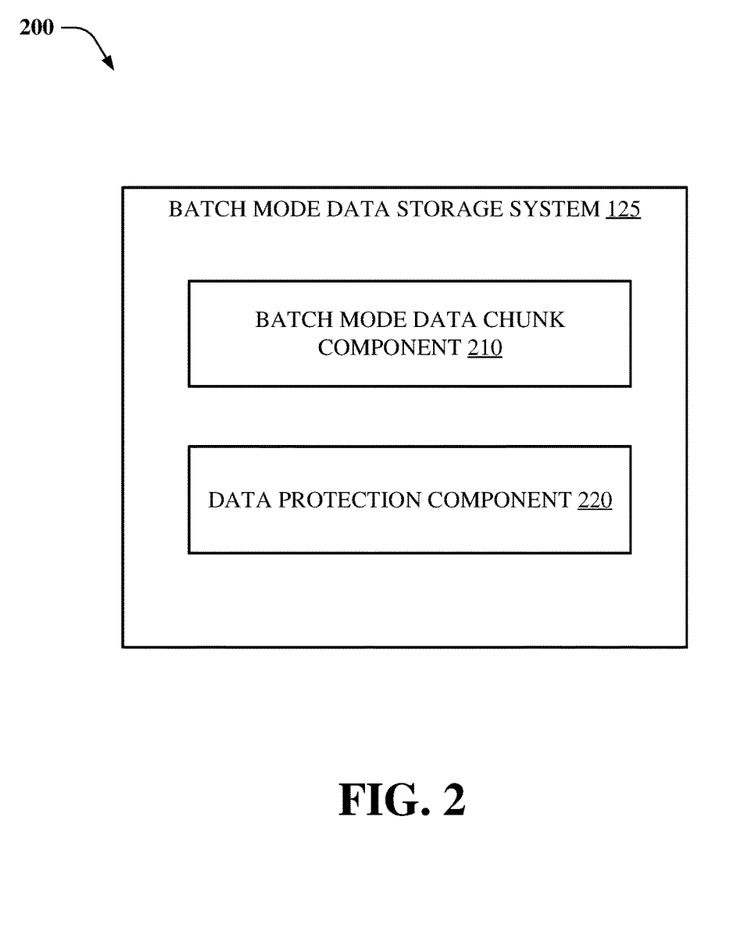
FIG. 2 illustrates a block diagram of a batch mode data storage system, in accordance with various example embodiments.
Figure 3:
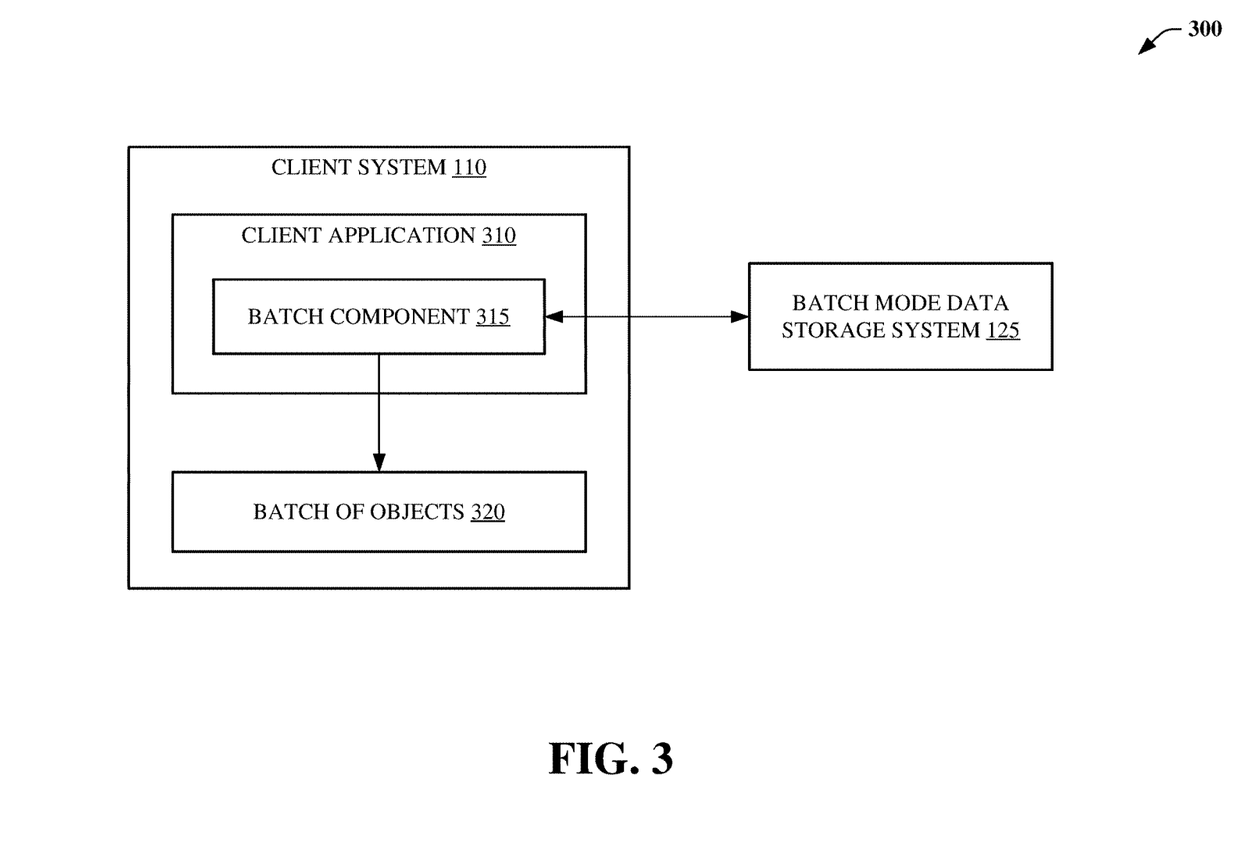
FIG. 3 illustrates a block diagram of a client system comprising a batch component, in accordance with various example embodiments.

As illustrated by FIG. 3, batch component 315 of client application 310 can compile, assemble, create, etc. a group of data objects, e.g., batch of objects 320, comprising data, metadata, a message, etc. corresponding to client application 310. In an embodiment, batch component 315 can inform, via a message, batch mode data storage system 125 that client application 310 utilizes batch mode object creation, e.g., that client application 310 has assembled, compiled, etc. a batch of objects (e.g. 320).

In turn, batch mode data storage system 125 can assign an identification (ID) to the batch of objects, e.g., to distinguish between other object requests, e.g., corresponding to other applications (not shown), other batches of objects (not shown), etc.

In one embodiment, batch mode data storage system 125 can receive, from batch component 315, information representing a total number of objects that have been included in the batch of objects, and representing a data size of the batch of objects. In turn, and now referring to FIG. 4, batch mode data chunk component 210 can pre-create, designate, dedicate, etc., based on the information, data storage chunks (412, 414) of a group of data storage chunks within primary data storage site 410—the group of data storage chunks being designated, dedicated, etc. for storage of the batch of objects.

Figure 4:
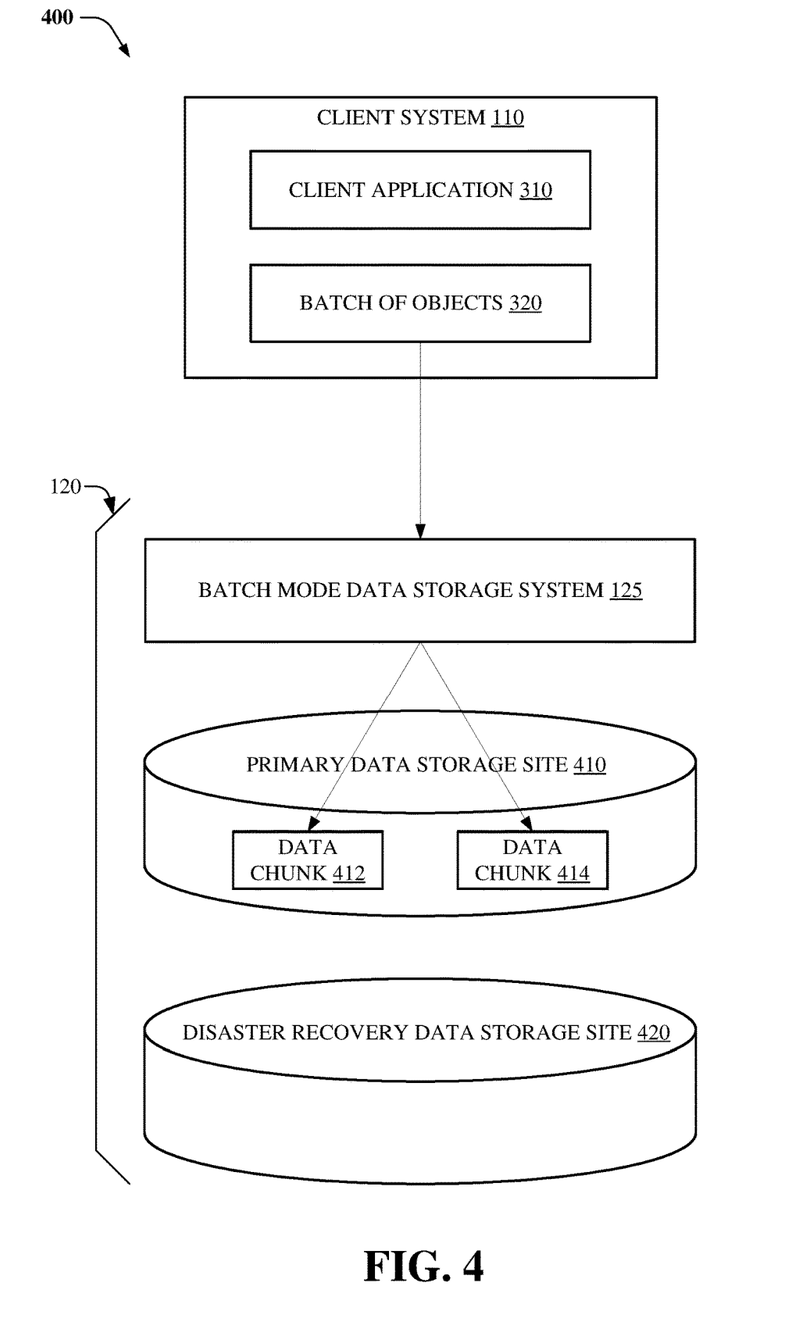
FIG. 4 illustrates a block diagram of a batch mode data storage system facilitating storage of a batch of objects in a group of dedicated data chunks, in accordance with various example embodiments.

In this regard, in an embodiment, in response to first objects of the batch of objects being streamed, e.g., via a bulk write performed by client application 310, batch mode data chunk component 210 can write, store, etc. the first objects in the group of data storage chunks. Further, based on a determination that a data storage chunk (412, 414) of the group of data storage chunks contains a defined amount of data, e.g., representing that the data storage chunk has been filled, batch mode data chunk component 210 can seal the data storage chunk to obtain a sealed, e.g., immutable, read-only, etc. data storage chunk.

Figure 5:
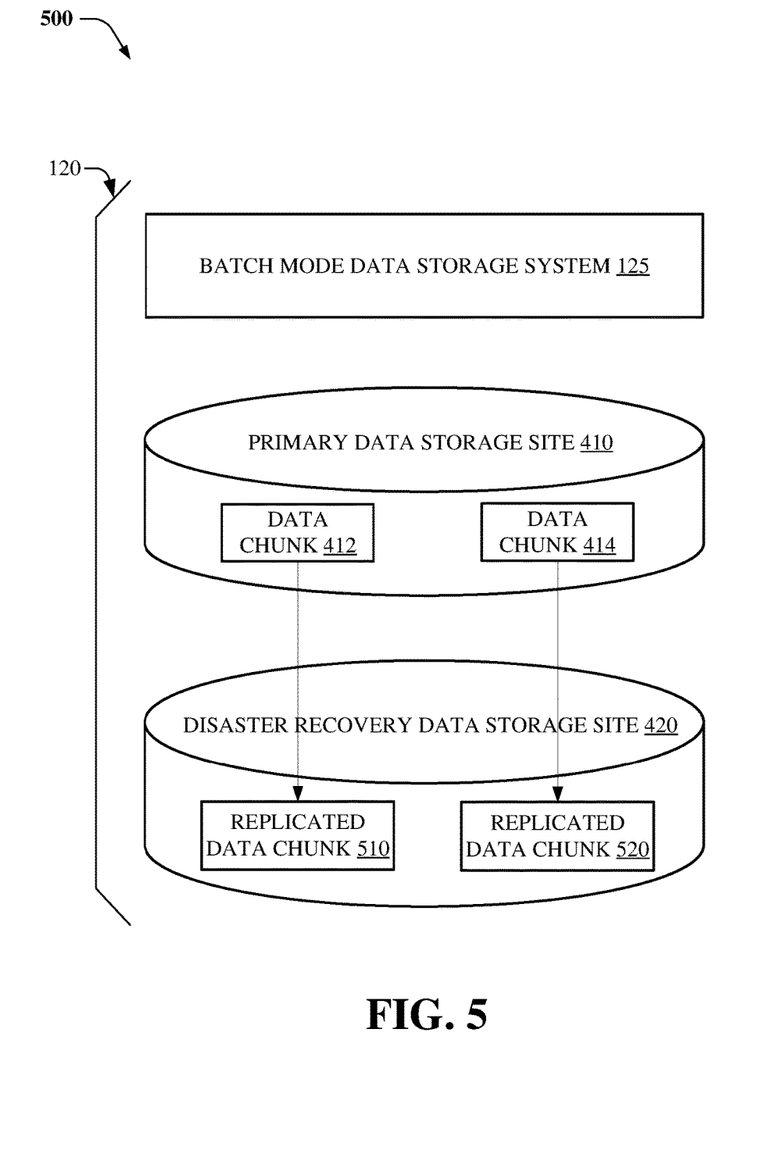
FIG. 5 illustrates a block diagram of a batch mode data storage system facilitating replication of data chunks, in accordance with various example embodiments.

Referring now to FIG. 5, data protection component 220 can perform erasure encoding on the sealed data storage chunk, and replicate the sealed data storage chunk on a data recovery storage device, e.g., disaster recovery data storage 420 (e.g., within geographically distributed data storage 120), to obtain respective replicated data chunks (510, 520).

In one embodiment, batch mode data chunk component 210 can dynamically create the data storage chunks, e.g., in response to receiving portions of the data stream from client application 310, e.g., via a bulk write of batch of objects 320 performed by client application 310. For example, based on a determination that a first data storage chunk of the group of data storage chunks contains at least a defined amount of data, e.g., representing that the first data storage chunk has been filled, and based on a determination that remaining objects of the batch of objects have not been stored in the group of data storage chunks, batch mode data chunk component 210 can create a second data storage chunk of the group of data storage chunks, and store a portion of the remaining objects in the second data storage chunk.

Further, based on a determination that the second data storage chunk contains at least the defined amount of data, e.g., representing that the second data storage chunk has been filled, batch mode data chunk component 210 can seal the second data storage chunk to obtain a second sealed data storage chunk. In turn, data protection component 220 can perform erasure encoding on the second sealed data storage chunk, and replicate the second sealed data storage chunk on the data recovery storage device.

In another embodiment, data protection component 220 can periodically acknowledge, e.g., send partial acknowledgements, to batch component 315 indicating that subsets of objects of the batch of objects have been successfully protected, e.g., data protection component 220 can send an acknowledgment to batch component 315 representing that the first sealed data storage chunk and the second sealed data storage chunk have been replicated, protected, etc. on the data recovery storage device.

In turn, in response to determining that a partial acknowledgement corresponding to a subset of objects of the batch of objects has not been received, client application 310 can re-write, re-stream, etc. the subset of objects, e.g., via a bulk write operation. Further, batch mode data chunk component 210 can store the subset of objects in corresponding data chunks of the group of data storage chunks, and seal the corresponding data chunks to obtain sealed data chunks. Furthermore, data protection component 220 can perform erasure encoding on the sealed data chunks, and replicate the sealed data chunks on the data recovery storage device.

In another embodiment, based on a determination that client application 310 has completed the write, stream, etc. of the batch of objects, and that second objects of the batch of objects have not been replicated, protected, etc.—the second objects of the batch of objects comprising failed objects—data protection component 220 can send information to batch component 315 comprising a list of the failed objects that have not been replicated, protected, etc.

In turn, client application 310 can re-write, re-stream, etc. the failed objects; and batch mode data chunk component 210 can receive the failed objects from client application 310, store the failed objects in a data storage chunk, and seal the data storage chunk to obtain a sealed data storage chunk. Further, data protection component 220 can perform erasure encoding on the sealed data chunk, and replicate the sealed data storage chunk on the data recovery storage device.

FIGS. 6-9 illustrate methodologies for performing operations corresponding to cloud-based storage environment 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
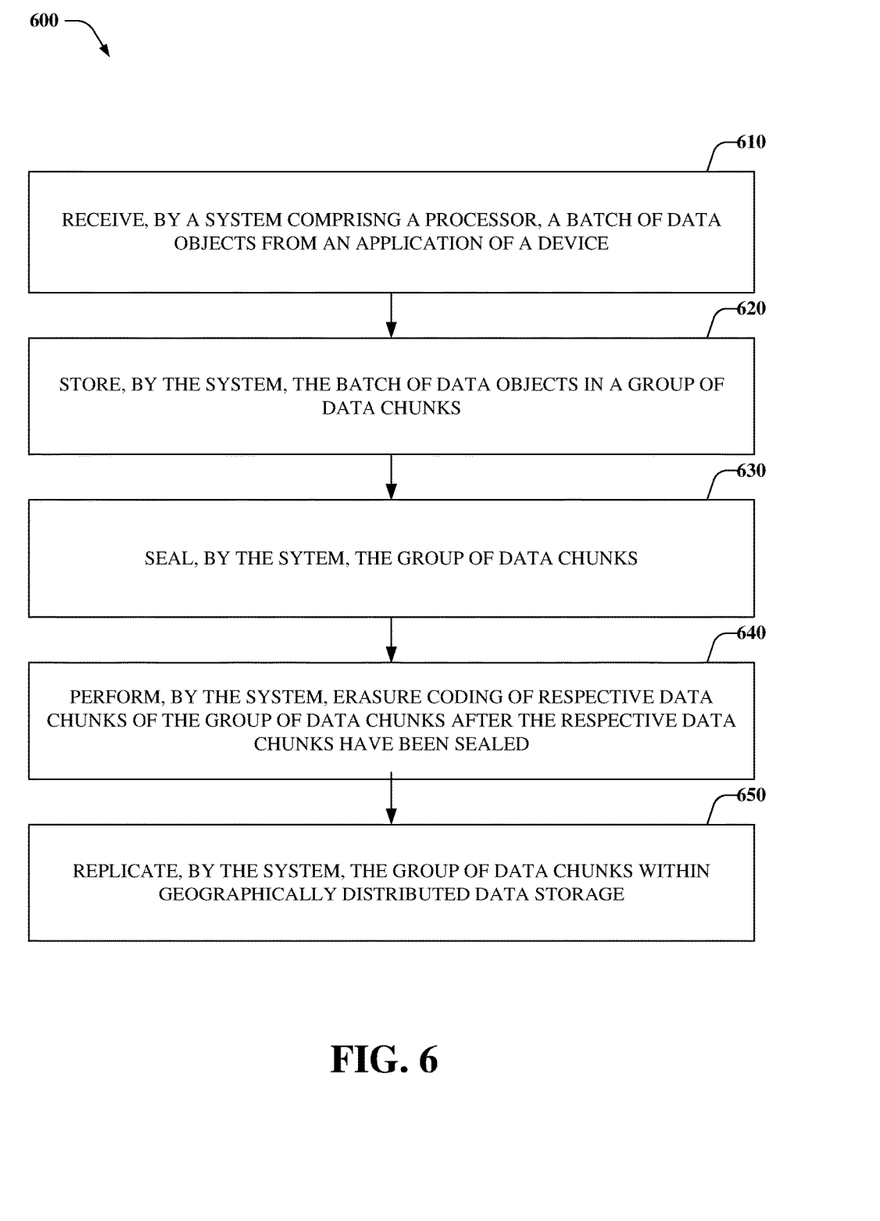
FIGS. 6-9 illustrate flow charts of methods associated with storage of a batch of objects in a group of dedicated data chunks, in accordance with various example embodiments.

Referring now to FIG. 6, a flowchart (600) of a method for storing a batch of objects in a group of dedicated data chunks is illustrated, in accordance with various example embodiments. At 610, a system comprising a processor (e.g., 125) can receive, e.g., via a data stream, a batch of data objects from an application of a device. At 620, the system can store the batch of data objects in a group of data chunks. At 630, the system can seal the group of data chunks. At 640, the system can perform erasure coding of respective data chunks of the group of data chunks after the respective data chunks have been sealed. At 650, the system can replicate the group of data chunks within geographically distributed data storage.

Figure 7:
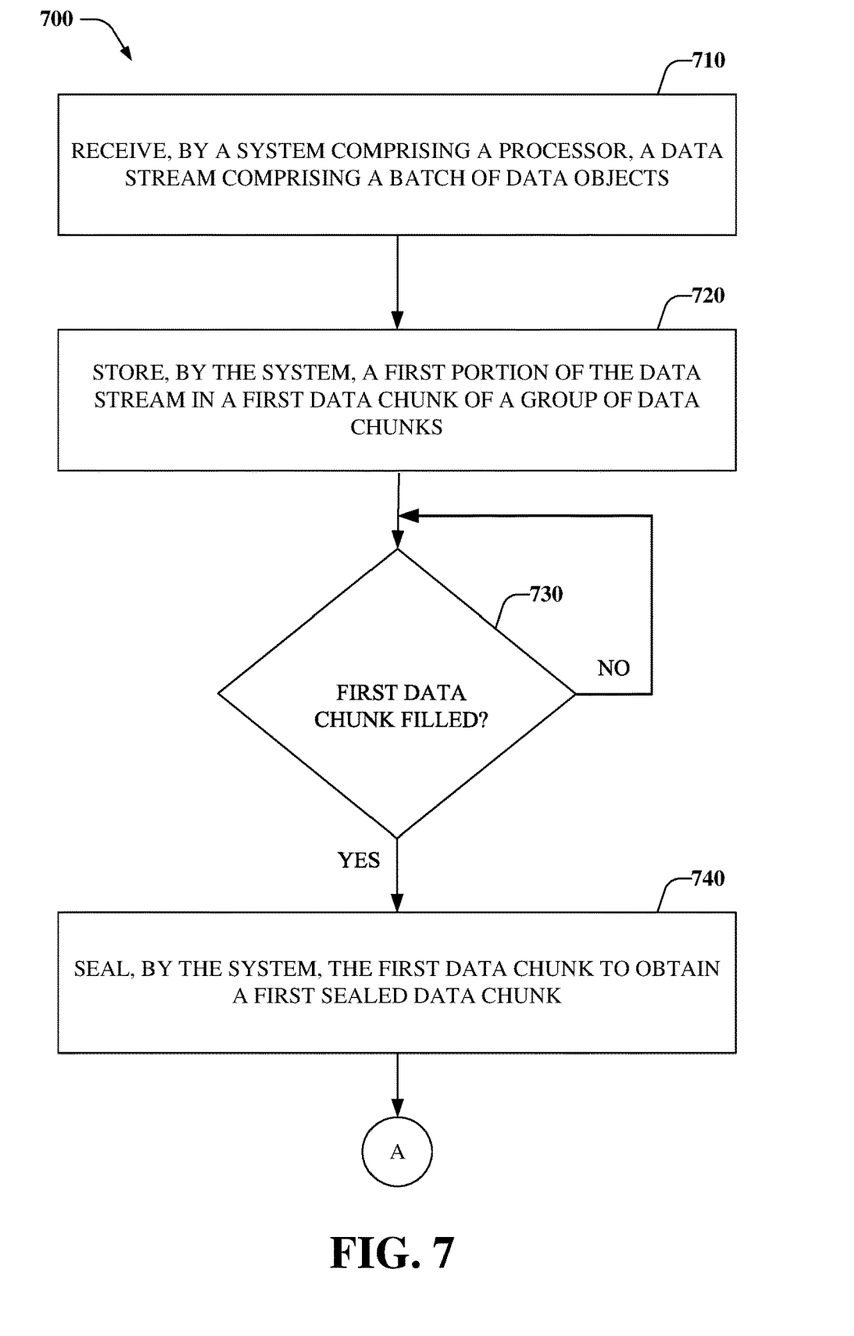
Figure 8:
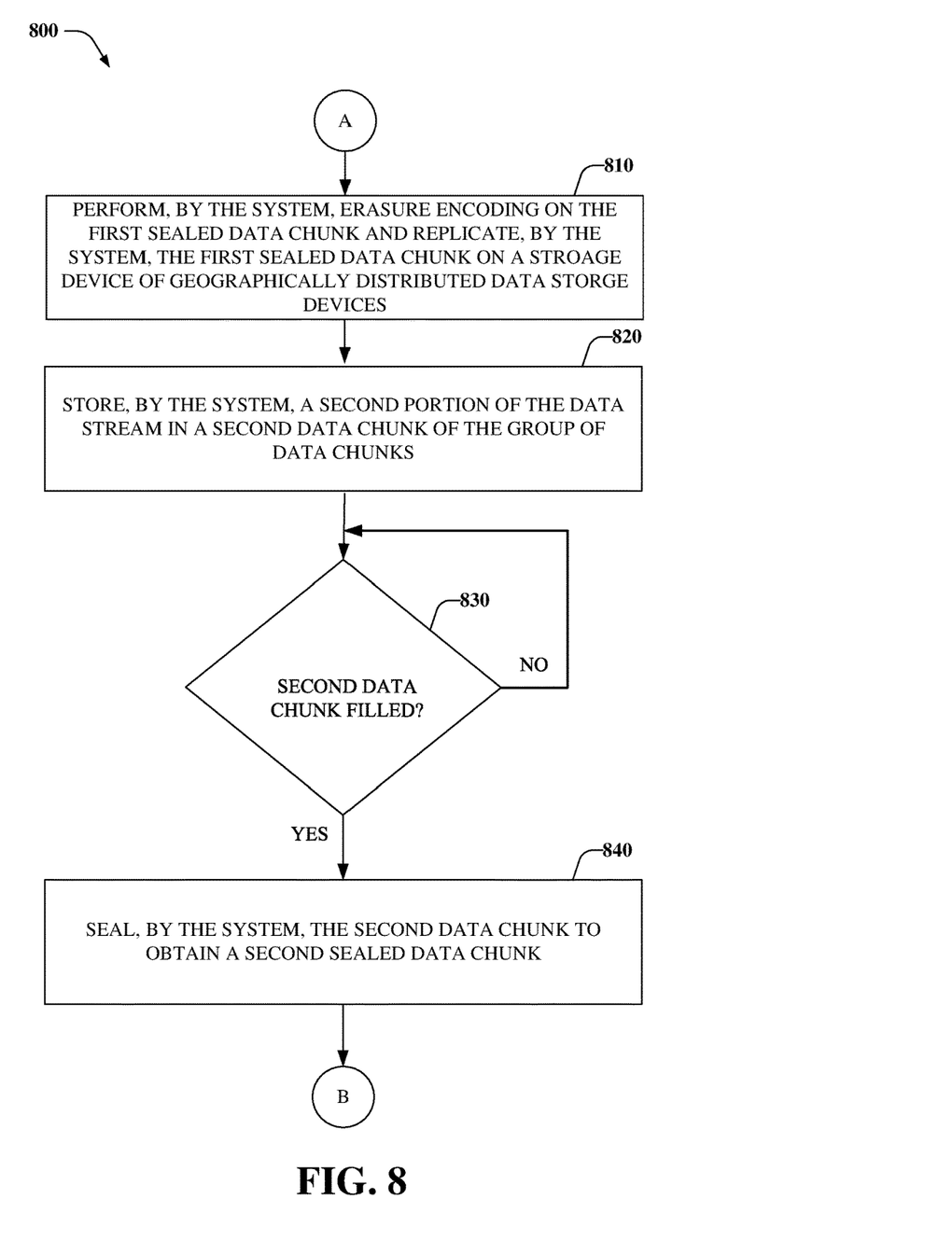
Figure 9:
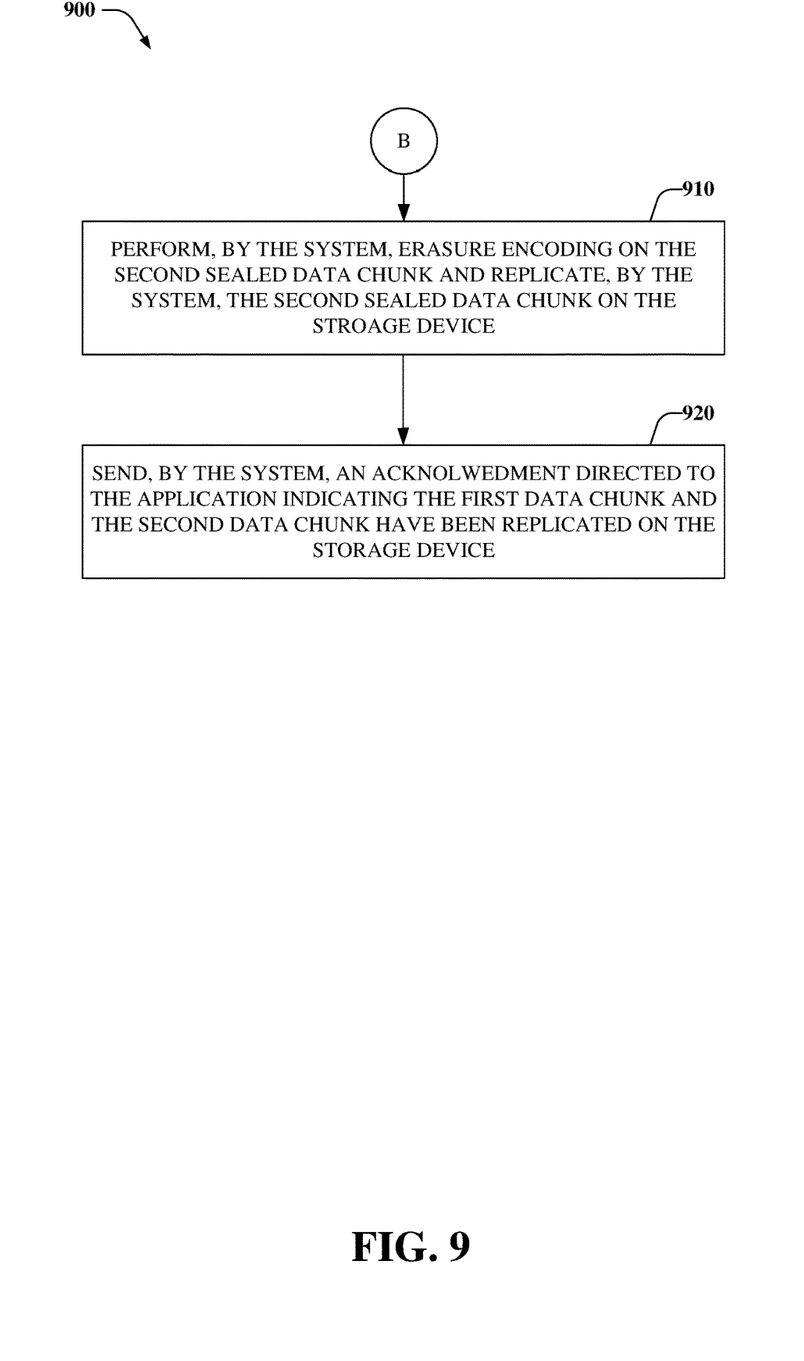

FIGS. 7-9 illustrates flowcharts (700-900) of another method for storing a batch of objects in a group of dedicated data chunks, in accordance with various example embodiments. At 710, a system comprising a processor (e.g., 125) can receive a data stream comprising a batch of objects. At 720, the system can store a first portion of the data stream in a first data chunk of a group of data chunks. At 730, in response to a determination that the first data chunk has been filled, e.g., with respect to a defined amount of data, flow continues to 740, at which the system can seal the first data chunk to obtain a first sealed data chunk; otherwise, flow returns to 730.

Flow continues from 740 to 810, at which the system can perform erasure encoding on the first sealed data chunk, and replicate the first sealed data chunk on a storage device of geographically distributed data storage devices.

Flow continues from 810 to 820, at which the system can store a second portion of the data stream in a second data chunk of the group of data chunks. At 830, in response to a determination that the second data chunk has been filled, e.g., with respect to the defined amount of data, flow continues to 840, at which the system can seal the second data chunk to obtain a second sealed data chunk; otherwise, flow returns to 830.

Flow continues from 840 to 910, at which the system can perform erasure encoding on the second sealed data chunk, and replicate the second sealed data chunk on the storage device. At 920, the system can send an acknowledgment directed to the application indicating the first data chunk and the second data chunk have been replicated on the storage device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via batch mode data storage system 125, to store a batch of objects in a group of data chunks, and based on a determination that respective data chunks of the group of data chunks contain a defined amount of data, seal, erasure encode, and replicate the respective data chunks, as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by data recovery system 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in batch mode data storage system 125, geographically distributed data storage 120, non-volatile memory 1022 (see below), disk storage 1024 (see below), and/or memory storage 1046 (see below).

Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
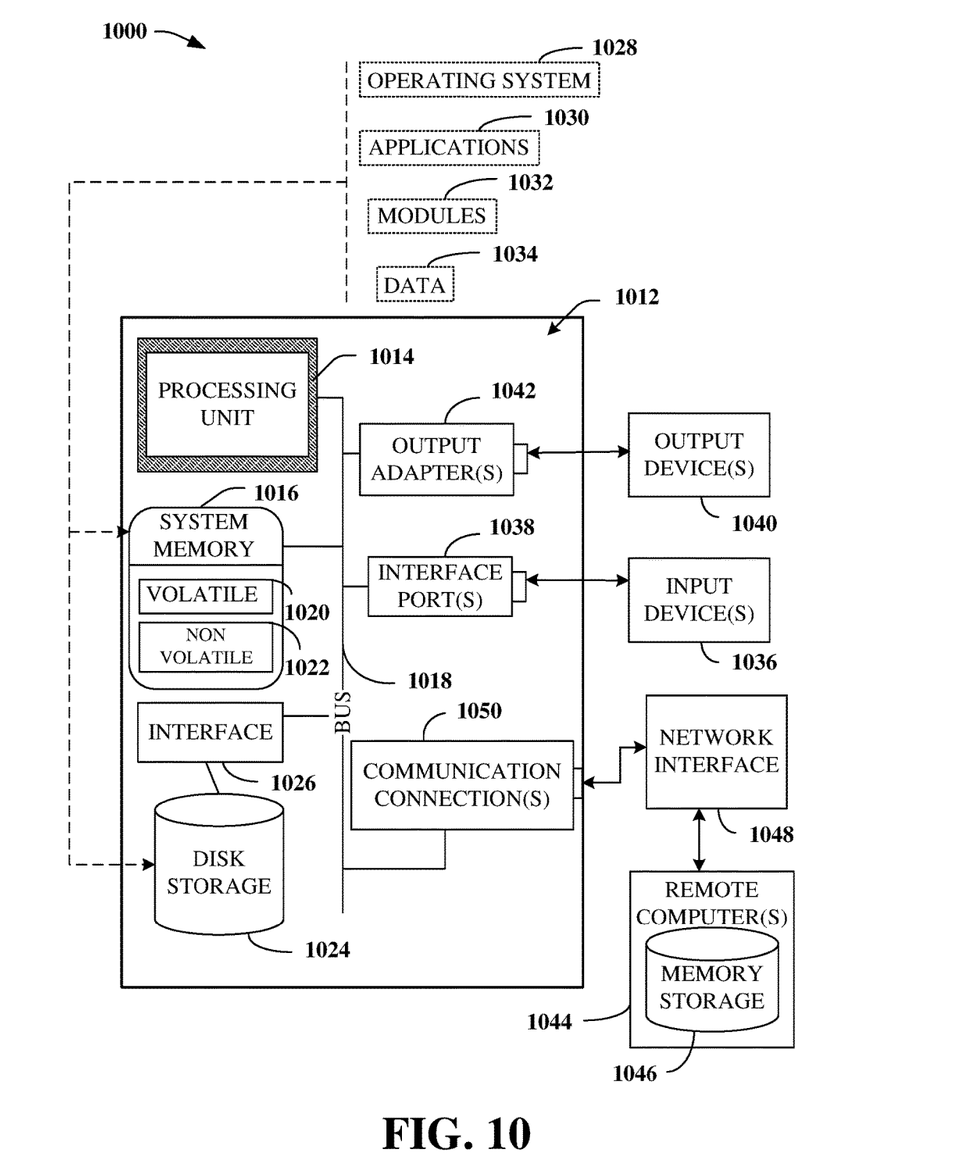
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., data recovery system 110, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a batch mode data chunk component configured to:
      facilitate a creation of a batch of objects corresponding to an application;
      store first objects of the batch of objects in a group of data storage chunks; and
      based on a determination that a data storage chunk of the group of data storage chunks contains at least a defined amount of data, seal the data storage chunk to obtain a sealed data storage chunk; and
   a data protection component configured to:
      perform erasure encoding on the sealed data storage chunk, and
      replicate the sealed data storage chunk on a data recovery storage device.

2. The system of claim 1, wherein the batch mode data chunk component is further configured to:
   receive, from the application, information representing a number of objects comprising the first objects that have been included in the batch of objects, and further representing a data size of the batch of objects.

3. The system of claim 2, wherein the batch mode data chunk component is further configured to:
   based on the information, create the group of data storage chunks.

4. The system of claim 1, wherein the data storage chunk is a first data storage chunk, wherein the determination is a first determination, and wherein the batch mode data chunk component is further configured to:
   based on the first determination that the first data storage chunk contains the defined amount of data, and based on a second determination that second objects of the batch of objects have not been stored in the group of data storage chunks, create a second data storage chunk of the group of data storage chunks, and
store a portion of the second objects in the second data storage chunk.

5. The system of claim 4, wherein the sealed data storage chunk is a first sealed data storage chunk, and wherein the batch mode data chunk component is further configured to:
based on a third determination that the second data storage chunk contains the defined amount of data, seal the second data storage chunk to obtain a second sealed data storage chunk.

6. The system of claim 5, wherein the data protection component is further configured to:
perform erasure encoding on the second sealed data storage chunk; and
replicate the second sealed data storage chunk on the data recovery storage device.

7. The system of claim 6, wherein the data protection component is further configured to:
send an acknowledgment directed to the application representing that the first sealed data storage chunk and the second sealed data storage chunk have been replicated on the data recovery storage device.

8. The system of claim 1, wherein the determination is a first determination, and wherein the data protection component is further configured to:
based on a second determination that the application has completed the creation of the batch of objects, and that second objects of the batch of objects have not been replicated, sending information directed to the application representing the second objects have not been replicated.

9. The system of claim 8, wherein the data storage chunk is a first data storage chunk, wherein the sealed data storage chunk is a first sealed data storage chunk, and wherein the batch mode data chunk component is further configured to:
receive the second objects from the application;
create a second data storage chunk of the group of data storage chunks;
store a portion of the second objects in the second data storage chunk; and
based on a third determination that the second data storage chunk contains the defined amount of data, seal the second data storage chunk to obtain a second sealed data storage chunk.

10. The system of claim 9, wherein the data protection component is further configured to:
perform erasure encoding on the second sealed data storage chunk, and
replicate the second sealed data storage chunk on the data recovery storage device.

11. A method, comprising:
in response to facilitating, by a system comprising a processor, generation of a group of data objects of an application of a first device, storing, by the system, a portion of the group of data objects in a group of data chunks; and
in response to a data chunk of the group of data chunks being determined to satisfy a defined condition with respect to an amount of data that has been included in the data chunk,
sealing the data chunk to obtain a sealed data chunk, performing erasure encoding on the sealed data chunk, and
replicating the sealed data chunk on a second device of geographically distributed data storage devices.

12. The method of claim 11, wherein the facilitating comprises:
creating, by the system via the application, the group of data objects.

13. The method of claim 11, wherein the storing comprises:
receiving, from the application, a data stream comprising the portion of the group of data objects; and
storing the data stream in the group of data chunks.

14. The method of claim 11, wherein the storing comprises:
receiving, from the application, information representing at least one of: a number of data objects of the application that have been included in the group of data objects, respective sizes of the data objects that have been included in the group of data objects, or a data size of the group of data objects; and
based on the information, generating the group of data chunks.

15. The method of claim 11, wherein the data chunk is a first data chunk, wherein the portion is a first portion, and wherein the storing comprises:
generating the first data chunk;
storing the first portion in the first data chunk; and
in response to the sealing of the first data chunk,
generating a second data chunk of the group of data chunks, and
storing a second portion of the group of data objects in the second data chunk.

16. The method of claim 15, further comprising:
sealing, by the system, the second data chunk to obtain another sealed data chunk; and
replicating, by the system, the other sealed data chunk on the second device.

17. The method of claim 11, further comprising:
sending, by the system, status information directed to the application, wherein the status information represents data objects of the group of data objects that have not been replicated.

18. A machine-readable storage medium comprising instructions that, in response to execution, cause a system comprising a processor to perform operations, comprising:
facilitating a compilation, via an application, of objects of the application into a batch of objects;
in response to receiving, from the application, a stream of data comprising the batch of objects, storing a first portion of the batch of objects in data storage chunks; and
in response to determining that a data storage chunk of the data storage chunks has been filled with a defined amount of data,
sealing the data storage chunk resulting in a sealed data storage chunk,
performing erasure coding on the sealed data storage chunk, and
replicating the sealed data storage chunk to a data storage device.

19. The machine-readable storage medium of claim 18, wherein the operations further comprise:
in response to receiving, from the application, information representing at least one of a number of the objects that have been included in the batch of objects, respective sizes of the objects that have been included in the batch of objects, or a size of the batch of objects, generating the data storage chunks based on the information.

20. The machine-readable storage medium of claim 18, wherein the operations further comprise:

sending information directed to the application specifying a second portion of the batch of objects that have not been replicated on the data storage device.

* * * * *